United States Patent [19]
Miyajima et al.

[11] Patent Number: 5,472,746
[45] Date of Patent: Dec. 5, 1995

[54] METHOD OF PRODUCING AN ELECTROSTATICALLY PAINTED MULTI-LAYERED HOSE

[75] Inventors: Atsuo Miyajima, Inuyama; Minoru Kawasaki; Tsutomu Kodama, both of Komaki, all of Japan

[73] Assignee: Tokai Rubber Industries, Ltd., Komaki, Japan

[21] Appl. No.: 178,542

[22] Filed: Jan. 7, 1994

[30] Foreign Application Priority Data

Jan. 8, 1993 [JP] Japan .................................. 5-017892
Dec. 28, 1993 [JP] Japan .................................. 5-336091

[51] Int. Cl.⁶ ................................ B05D 7/22; B05D 1/06
[52] U.S. Cl. ...................... 427/468; 427/230; 427/236; 427/282; 427/469; 427/470; 427/476; 427/544; 138/109; 138/137
[58] Field of Search .................................. 427/181, 182, 427/183, 230, 231, 233, 236, 469, 476, 485, 544, 470, 468, 282, 256; 264/129; 118/DIG. 10; 138/3, 137, 109

[56] References Cited

U.S. PATENT DOCUMENTS

| | | | |
|---|---|---|---|
| 2,555,519 | 6/1951 | Tolle et al. ................................ | 427/485 |
| 3,946,125 | 3/1976 | Scheiber .................................... | 427/544 |
| 4,368,219 | 1/1983 | Nagata et al. ............................ | 427/233 |
| 4,762,589 | 8/1988 | Akiyama et al. ..................... | 156/307.3 |
| 4,774,137 | 9/1988 | Alberts et al. ............................ | 428/407 |
| 4,842,944 | 6/1989 | Kuge et al. ............................... | 428/451 |
| 4,908,225 | 3/1990 | Niimura et al. .......................... | 427/485 |
| 5,194,328 | 3/1993 | Suzuki et al. ............................ | 427/485 |

FOREIGN PATENT DOCUMENTS

| | | | |
|---|---|---|---|
| 754797 | 10/1970 | Belgium ................................ | 427/476 |
| 255889 | 4/1988 | Germany ................................ | 427/231 |
| 60-21235 | 2/1985 | Japan . | |
| 63-227787 | 9/1988 | Japan ................................ | 427/476 |
| 1-247157 | 10/1989 | Japan ................................ | 138/137 |
| 3-275238 | 12/1991 | Japan . | |

OTHER PUBLICATIONS

Savage, Daniel R., "Powder Coating: A Look at Equipment and Materials", Products Finishing, Jan. 1972, pp. 40–51.

*Primary Examiner*—Terry J. Owens
*Attorney, Agent, or Firm*—Jacobson, Price, Holman & Stern

[57] ABSTRACT

A method for producing a multi-layered hose by electrostatically applying a thin resin layer on the inner surface of a tubular rubber outer layer. The resin can be applied by spraying resin powder from a bar nozzle inserted into an opening of the tubular outer layer, and the applied resin can be heated by an induction or dielectric heating source placed inside the tubular outer layer. The resin can be applied only to the hose body portion and not to edge portions which are to be attached to mating pipes, or a thinner layer of resin can be applied on the edge portions than on the body portion. An intermediate layer containing dielectric material or at least one of electrically conductive and magnetic material can be formed between the tubular outer layer and resin inner layer.

29 Claims, 7 Drawing Sheets

METHOD OF PRODUCING AN ELECTROSTATICALLY PAINTED MULTI-LAYERED HOSE

BACKGROUND OF THE INVENTION

1. Field of the Invention

The present invention relates to a method of producing a multi-layered hose which is suitable for producing fuel hoses, air intake hoses for automobiles and the like.

2. Description of the Related Art

Conventionally, rubber materials such as NBR-polyvinylchloride rubber which show superior oil resistance and oil penetration resistance are used for filler hoses (fuel hoses) for automobiles.

However, the above conventional filler hoses comprising only a single rubber layer cannot cope with recent severe regulations of oil penetration resistance.

As an attempt to meet the recent demand, as shown in FIG. 8(A), it has been suggested to produce a hose by forming a thin fluorine-contained rubber inner layer 102 on the inner surface of a rubber outer layer 100. Although this type of hose shows excellent performance, the production cost is very high. So, it is not suitable for practical use.

On the other hand, in the case of hoses for transmitting refrigerants, as shown in FIG. 8(B)(a), it is known to produce a hose by laminating a thin resin inner layer 104 on the inner surface of a rubber outer layer 100. By employing this hose structure and laminating the resin inner layer 104 having excellent gasoline resistance and excellent gasoline penetration resistance on the inner surface of the rubber outer layer 100, the gasoline resistance and gasoline penetration resistance of the hose can be increased at a low cost, while maintaining flexibility which is required for filler hoses.

In this case, a hard resin material is usually used as the resin inner layer 104, and the resin inner layer 104 is formed at a certain thickness which is required to secure gasoline resistance and gasoline penetration resistance. This is because hard resin materials show more excellent gasoline resistance than that of soft resin materials in general.

Conventionally, hoses having this multi-layered structure have been produced, for example, by the following method. As shown in FIG. 8(B)(b), a mandrel 106 is employed and a resin tube constituting the resin inner layer 104 is extrusion molded, and then a rubber tube constituting the rubber outer layer 100 is laminated on the outer surface of the resin tube by extrusion molding. Next, the obtained rubber tube is vulcanized in the case of producing a straight hose. Otherwise, the obtained rubber tube is semivulcanized, then bent in a certain direction, and after that finishes vulcanizing in the case of producing a bent hose.

However, it is difficult to employ this method in producing hoses having large inner diameters, because the mandrel 106 must be drawn out from the hoses after vulcanization but is hard to be drawn out. Further, it is difficult to employ this method in producing hoses having complicated shapes such as hoses having a bellows portion or complicatedly bent portions.

In the meanwhile, the resin constituting the resin inner layer 104 is preferably a hard resin material in view of gasoline resistance, as described in the above. Accordingly, in view of hose flexibility, the thickness of the resin inner layer 104 must be small. Here, it may be considered to form the resin inner layer 104 by injection molding. In the case of forming the resin inner layer 104 by injection molding, however, it is difficult to make the thickness of the resin inner layer 0.3 mm or less. Further, as disclosed in Japanese Unexamined Patent Publication (KOKAI) NO.275238/1991, it may be considered to form the resin inner layer 104 by a blow molding method, that is, by disposing a resin parison (form) in the inner space of the outer layer 100 and blowing an air into the parison so that the parison is swelled in a centrifugal direction and closely adheres to the inner surface of the outer layer 100. However, the accuracy of the thickness of the resin inner layer 104 cannot be secured sufficiently. Further, when the thickness of the resin parison is too small, the cooling speed is increased and it is difficult to maintain the resin in a softened state. So, there has been a limit in decreasing the thickness of the resin inner layer 104.

SUMMARY OF THE INVENTION

The production method according to the present invention has been conceived in view of the above circumstances. It is therefore an object of the present invention to provide a method of producing a multi-layered hose which is advantageous in laminating a thin resin inner layer on an outer layer.

The method of producing a multi-layered hose according to the present invention is a method of producing a multi-layered hose comprising a tubular outer layer formed of a predetermined material and a resin inner layer formed on an inner surface of the outer layer, wherein said resin inner layer is laminated by painting resin constituting said resin inner layer.

The method of producing a multi-layered hose according to the present invention comprises the steps of: making the resin constituting the resin inner layer adhere to the inner surface of the outer layer by painting and then heating the painted resin; and cooling the painted resin, thereby forming said resin inner layer. It is preferable to melt the painted resin in heating.

Preferably, the painting is conducted by electrostatic painting in which the resin is charged with one of positive electricity and negative electricity and the charged resin adheres to the outer layer by electrostatic attractive force. In this case, it is preferable to apply resin powder by electrostatic painting.

In general, the outer layer is basically formed of a rubber material.

In the method of producing a multi-layered hose according to the present invention, the rubber material constituting the outer layer can have a surface specific resistivity of not more than $1 \times 10^{11}$ ohm, or a volume specific resistivity of not more than $1 \times 10^{10}$ ohm cm. The resistivity can be controlled by controlling the amount of a conductive material contained in the rubber material, which is generally carbon black. When the rubber outer layer has a resistivity in that range, superior electrostatic painting can be applied to the outer layer, and defects such as uneven thickness and pin holes can be diminished. The surface specific resistivity and the volume specific resistivity are in accordance with ASTM D257-78.

The present inventors examined the relationship between the amount of carbon black, resistivity and electrostatic paintability. The experiment was conducted by producing rubber sheets with varying the amount of carbon black and measuring the surface specific resistivity and the volume specific resistivity. Further, electrostatic painting was actually applied to the rubber sheets, so as to measure the electrostatic paintability. The results are shown in Table 1 and FIGS. 7(A) and 7(B). In FIGS. 7(A) and 7(B), M2 are ranges in which the electrostatic paint was superior. Especially, the electrostatic paint was excellent in the ranges of M1. In electrostatic painting, rubber sheets having high surface specific resistivity showed insufficient adhesion of resin, and caused defects such as uneven painting and pin holes. This is supposed to be because electric charge on the resin is difficult to be released from the rubber sheets. Accordingly, as understood from the ranges of M1 and M2 in FIGS. 7(A) and 7(B), it is preferable so as to obtain superior electrostatic paintability that the surface specific resistivity is not more than $1 \times 10^{11}$ ohm.

TABLE 1

| SAMPLE NO. | CARBON ($g/cm^3$) | SURFACE SPECIFIC RESISTIVITY (ohm × $10^7$) | VOLUME SPECIFIC RESISTIVITY (ohm cm × $10^7$) |
| --- | --- | --- | --- |
| 1 | 0.52 | 106 | 28 |
| 2 | 0.39 | 288 | 43 |
| 3 | 0.38 | 1680 | 54 |
| 4 | 0.30 | 7200 | 218 |
| 5 | 0.02 | 840000 | 21212 |

It is also preferable that the volume specific resistivity is not more than $1 \times 10^{10}$ ohm cm. In this range, the rubber sheets can have an antistatic effect.

According to the method of the present invention, the resin material constituting the resin inner layer is preferably set to have a volume specific resistivity of not more than $1 \times 10^{10}$ ohm cm. As mentioned in the description of the problems of the related art, the method Of the present invention is advantageous in producing hoses having large inner diameters and complicated shapes such as a shape having a bellows portion and a shape having a bent portion. Typically, the method of the present invention is advantageous in producing fuel filler hoses for automobiles. In the case of a filler hose, because electrostatic charge caused by gasoline flows in supplying gasoline or those due to vibrations of vehicles may spark, there arises a fear that pinholes generate in the resin inner layer. Therefore, it is preferable to take antistatic measures for releasing electric charge. In the method of the present invention, a superior antistatic effect is achieved by setting the volume specific resistivity to be not more than $1 \times 10^{10}$ ohm om, which is achieved, for example, by mixing carbon or the like in the resin inner layer.

In the method of the present invention, it is preferable that a pretreatment before adhesion is applied on the inner surface of the outer layer before the painting. The pretreatment is to roughen the inner surface of the outer layer in order to improve physical engagement with the resin inner layer. The pretreatment includes sodium-etching treatment, corona treatment in which corona discharge is applied in the air, low temperature plasma treatment and so on. The sodium etching treatment can be applied, for example, by the following method. First, the outer layer is subjected to toluene treatment, and then immersed in sodium etching treatment liquid (a solution of sodium-naphthalene in tetrahydrofuran or ammonia) and then washed with methanol to remove excessive sodium etching treatment liquid. After that, the obtained outer layer is washed with water to remove methanol coating.

In the method of the present invention, it is preferable that the heating is conducted by a heating source placed on the side of the inner surface of the outer layer. This achieves to suppress the rise in temperature of the outer layer, to avoid influence of heat on the outer layer, and to prevent heat deterioration of the outer layer, while heating and melting the resin inner layer. The heating source may give radiation heating such as far infrared heating, hot blow heating and the like. In the case of radiation heating, a bar heater, an infrared heater or the like may be placed on the side of the inner surface of the outer layer.

In the method of the present invention, it is preferable that the resin inner layer is heated by high frequency heating in which an alternating magnetic field or an alternating electric field has a high frequency. The high frequency heating may be induction heating or dielectric heating. The induction heating is to heat by using hysteresis loss due to heat generation by a hysteresis phenomenon, or to heat by using eddy current loss due to heat generation by eddy current. In the former case, it is preferable to use magnetic substance having a high hysteresis coefficient. In the dielectric heating, barium titanate can be used.

The high frequency heating allows the resin inner layer to be selectively heated. Concretely, resin powder is mixed with metal powder, electric conductors such as carbon, magnetic substance such as ferrite, magnetite, and rare earth magnetic materials such as neodymium-cobalt and samarium cobalt, dielectric substance or the like. The examples of ferrite are $ZnFe_2O_4$, $NiFe_2O_4$, $Fe_3O_4$, $CoFe_2O_4$, and $CuFe_2O_4$. The mixture is applied to the inner surface of the outer layer by electrostatic painting. Then, a high frequency alternating magnetic field or alternating electric field is applied to the hose. As a result, the induction heating or dielectric heating causes the metal powder, electric conductors, magnetic substance or dielectric substance to generate heat, thereby melting the resin.

In the hose of the present invention, it is possible that electric conductors such as carbon, magnetic substance such as ferrite, dielectric substance or the like is not mixed in the resin inner layer on the most inner side but is mixed in an intermediate layer in order to heat the intermediate layer selectively. Alternatively, it is possible that electric conductors, magnetic substance, dielectric substance, or the like is applied directly on the outer layer by coating or the like, and then resin powder is applied on the coating by electrostatic painting. In this construction, inner fluid such as gasoline will contact the resin inner layer which does not contain the aforementioned materials such as electric conductors. This prevents defects such as rust of metal powder which has been mixed as electric conductors.

The magnetic substance powder is desirably ferromagnetic. The magnetic substance powder may be iron based powder such as ferrite powder, magnetite powder, maghemite powder, martensite stainless steel powder, and ferrite stainless steel powder. The particle size of the magnetic substance powder can be appropriately selected in accordance with the kinds of hoses. For example, the particle size may be in a range from 1 to 500 microns. As the particle size of the magnetic substance powder is smaller, the surface of the inner layer becomes smoother and the fluid flowability of the obtained hose is improved.

It is preferable that the painting is conducted by electrostatic painting as mentioned in the above, but other known methods can be employed such as an immersion-in-flowing-powder painting method, a spray method, a method of immersing the inner surface in liquid paint, and an electrodeposition coating method. The immersion-in-flowing-powder painting method is to use a vessel containing resin powder and immerse in the vessel the outer layer which has been heated above the melting point of the resin powder, while blowing an air into the resin powder in the vessel in order to flow the resin powder and make the resin powder adhere to the outer layer. At that time, the resin powder can adhere only to the inner surface of the outer layer by masking the outer surface of the outer layer.

The spray method is to spray resin so as to make the resin adhere to the inner surface of the outer layer. The method of immersing the inner surface in liquid paint is to make liquid resin adhere to the inner surface of the outer layer. For example, this is conducted by closing edge openings on the both longitudinal ends of the tubular outer layer and seal liquid in the outer layer in order to make the liquid adhere to the inner surface of the outer layer, or by masking the outer surface of the outer layer and immersing the outer layer in liquid.

The method of the present invention has the following functions and advantages.

According to the method of the present invention, the resin inner layer can be formed at a small uniform thickness. A thin resin inner layer can be easily formed not only on hoses with small inner diameters, but also on hoses with large inner diameters, those with a bellows portion, and those with other complicated shapes. Further, this method is advantageous in uniforming the thickness of the resin inner layer.

According to the method of the present invention, the resin inner layer can be partially formed only on a desired portion of the outer layer, by masking the area on which the resin inner layer is not desired to be laminated. Further, the thickness of the resin inner layer can be differentiated from the hose edge portions to the hose body portion formed between the edge portions, by controlling the resin amount in painting. Further, it is possible that the resin inner layer is formed only on the hose body portion and not on the hose edge portions. Further, it is easily achieved that the thickness of the resin inner layer at the hose edge portions is smaller than that at the hose body portion.

For example, in the case of a filler hose, when mating members are inserted into the hose edge portions, the hardness of the resin inner layer formed on the inner surface of the hose edge portions obstructs adherence to the mating members and decreases the sealing capacity at the boundary portions of the mating members and the resin inner layer. Therefore, in this case, it is desirable that no resin inner layer is formed at the hose edge portions or that the thickness of the resin inner layer at the hose edge portions is smaller than that at the hose body portion. The method of the present invention can easily produce this construction.

Electrostatic painting, especially electrostatic painting by using powder is preferably employed in the method of the present invention. This is advantageous in avoiding resin run and the like, and accordingly in decreasing and uniforming the thickness of the resin inner layer. Further, even when the outer layer has concaves and convexes such as bellows, the resin flies and adheres to hidden portions of the concaves and convexes by electrostatic attractive force. Therefore, that is advantageous in forming a superior resin inner layer.

According to the present invention, when the outer layer is basically formed of a rubber material, the rubber material positions on the outer side of the resin inner layer, and accordingly protects the resin inner layer, whereby the resin inner layer can avoid damage and deterioration.

When the outer layer has an electric resistivity in the above range, the electric resistivity of the outer layer is superior and the electrostatic paintability is improved.

On the other hand, when the inner layer has an electric resistivity in the above range, the electric resistance of the resin inner layer is superior and the antistatic performance is improved.

According to the present invention, when a pretreatment before adhesion is applied, the bonding strength of the resin inner layer and the outer layer is improved and sags of the resin inner layer can be avoided.

According to the present invention, when the resin which has adhered to the inner surface of the outer layer is heated from the inner surface side of the outer layer, namely, the resin coated side, the rise in temperature of the outer layer can be suppressed in heating the resin, and accordingly, bad influence of heat on the outer layer can be suppressed. As a result, durability of the outer layer is enhanced.

When resin constituting the resin inner layer, or an intermediate layer contains electric conductors, dielectric substance or magnetic substance, the resin is preferably heated by high frequency heating, especially by induction heating or dielectric heating. In this case, the electric conductors, the dielectric substance or the magnetic substance generate heat in themselves, thereby heating the resin. Since the outer layer is not directly heated, influence of heat on the outer layer can be effectively avoided and heat deterioration of the outer layer can be suppressed and the durability of the outer layer can be improved.

DETAILED DESCRIPTION OF THE PREFERRED EMBODIMENTS

Having generally described the present invention, a further understanding can be obtained by reference to the specific preferred embodiments which are provided herein for purposes of illustration only and are not intended to limit the of the appended claims.

The preferred embodiments according to the present invention will be hereinafter described with reference to the figures.

Figure 2A:
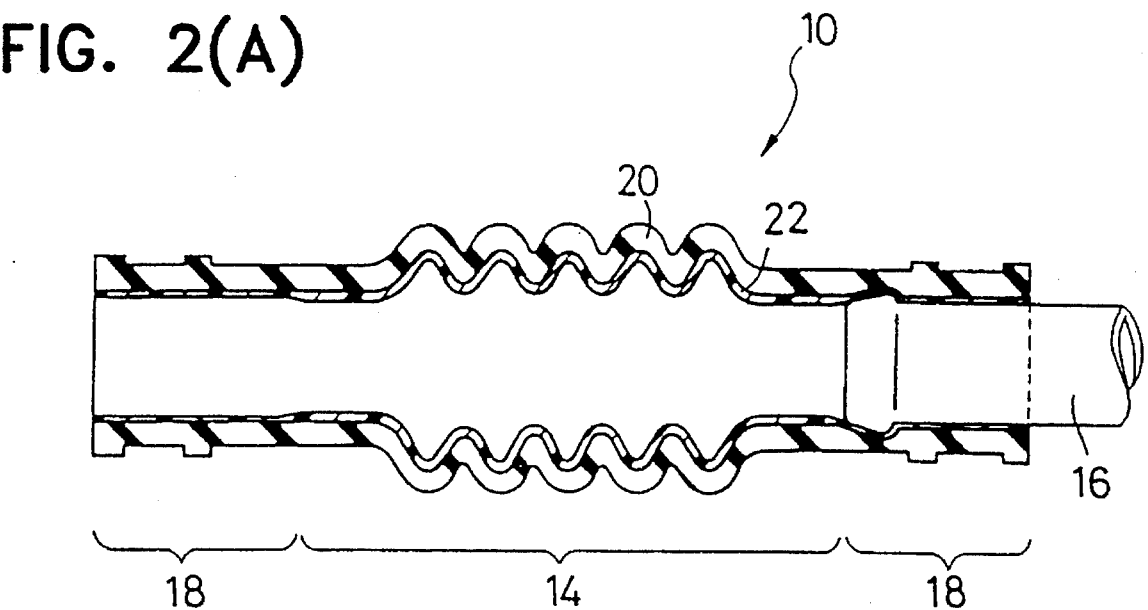
FIGS. 2(A), 2(B) and 2(C) are cross-sectional views of the hose produced by the method shown in FIG. 1.

Referring now to FIG. 2(A), 10 designates a multi-layered hose having a large inner diameter (for example, 34 mm in inner diameter) which is suitable for a filler hose for automobiles in which gasoline flows. The hose 10 comprises a hose body portion 14 having a shape of bellows and positioned in an intermediate, and edge portions 18 in which mating metal pipes 16 are inserted for connection.

Figure 2B:
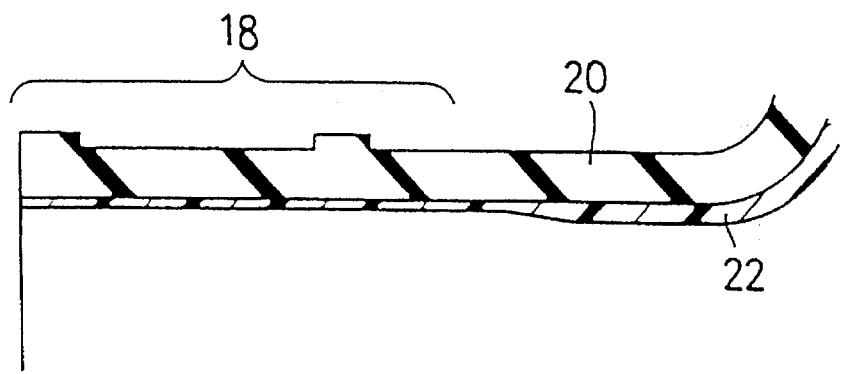
Figure 2C:
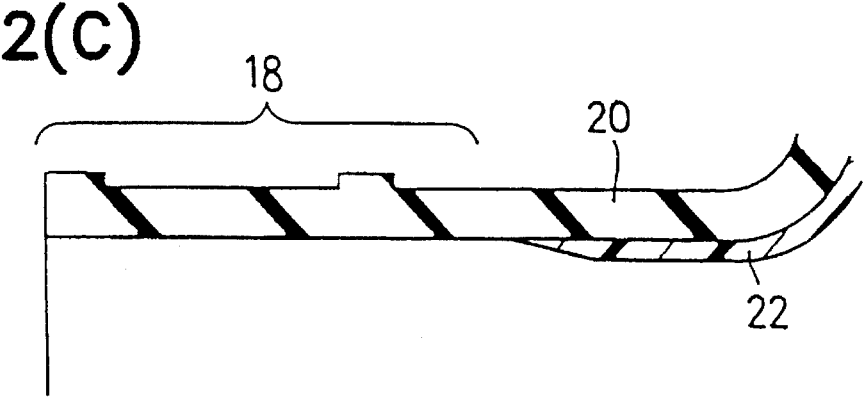

Both the body portion 14 and the edge portions 18 of the hose 10 have a multi-layered structure comprising a rubber outer layer 20 and a resin inner layer 22. Further, as shown in FIG. 2(B), the thickness of the resin inner layer 22 at the edge portions 18 is smaller than that at the hose body portion 14. For example, while the resin inner layer 22 at the hose body portion 14 is set to have a thickness of not more than 0.3 mm (and not less than 0.01 mm), the resin inner layer 22 at the edge portions 18 is set to have a thickness of 0.05 mm or less.

Because the resin inner layer 22 at the edge portions 18 has an extremely small thickness, it is possible to maintain the flexibility of the edge portions 18 and obtain a superior sealing capacity when the mating pipes 16 are inserted into the edge portions 18 for connection.

Figure 6:
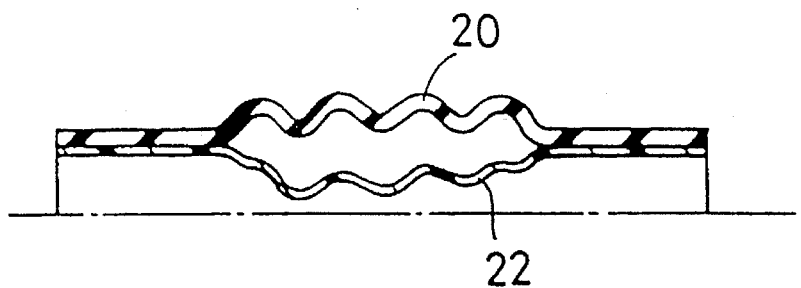
FIG. 6 is an explanatory drawing for showing an advantage of the producing method shown in FIG. 1.

In the conventional hoses, there is a possibility that as shown in FIG. 6, the resin inner layer 22 is peeled off from the rubber outer layer 20 and sags into the inner space of the hose 10. In this embodiment, however, because the rubber outer layer 20 and the resin inner layer 22 are bonded together by an adhesive treatment, it is prevented that negative pressure on the inner space of the hose 10, vibrations acted on the hose 10, deformations of the hose 10 cause the resin inner layer 22 to peel off from the outer layer 20 and sag into the inner space of the hose 10.

When the resin inner layer 22 is laminated on the rubber outer layer 20, heat at the processing or the like alone cannot bond the layers together satisfactorily because of the physical difference of the layers. Therefore, if the resin inner layer 22 is simply laminated on the rubber outer layer 20, there is a fear of sags as described in the above. However, in this embodiment, since the rubber outer layer 20 and the resin inner layer 22 are bonded together by the adhesive treatment, the above problem does not occur.

In this preferred embodiment, the rubber outer layer 20 is formed of a rubber material such as NBR-PVC, CR, CHC, CSM, EPDM and the like. The resin inner layer 22 is formed of a resin which is superior in gasoline resistance and gasoline penetration resistance, such as polyamide resin, fluorine-contained resin, polyester resin, polyvinyl chloride resin, polyacetal resin, PPS (polyphenylene sulfide) resin and the like.

Figure 1:
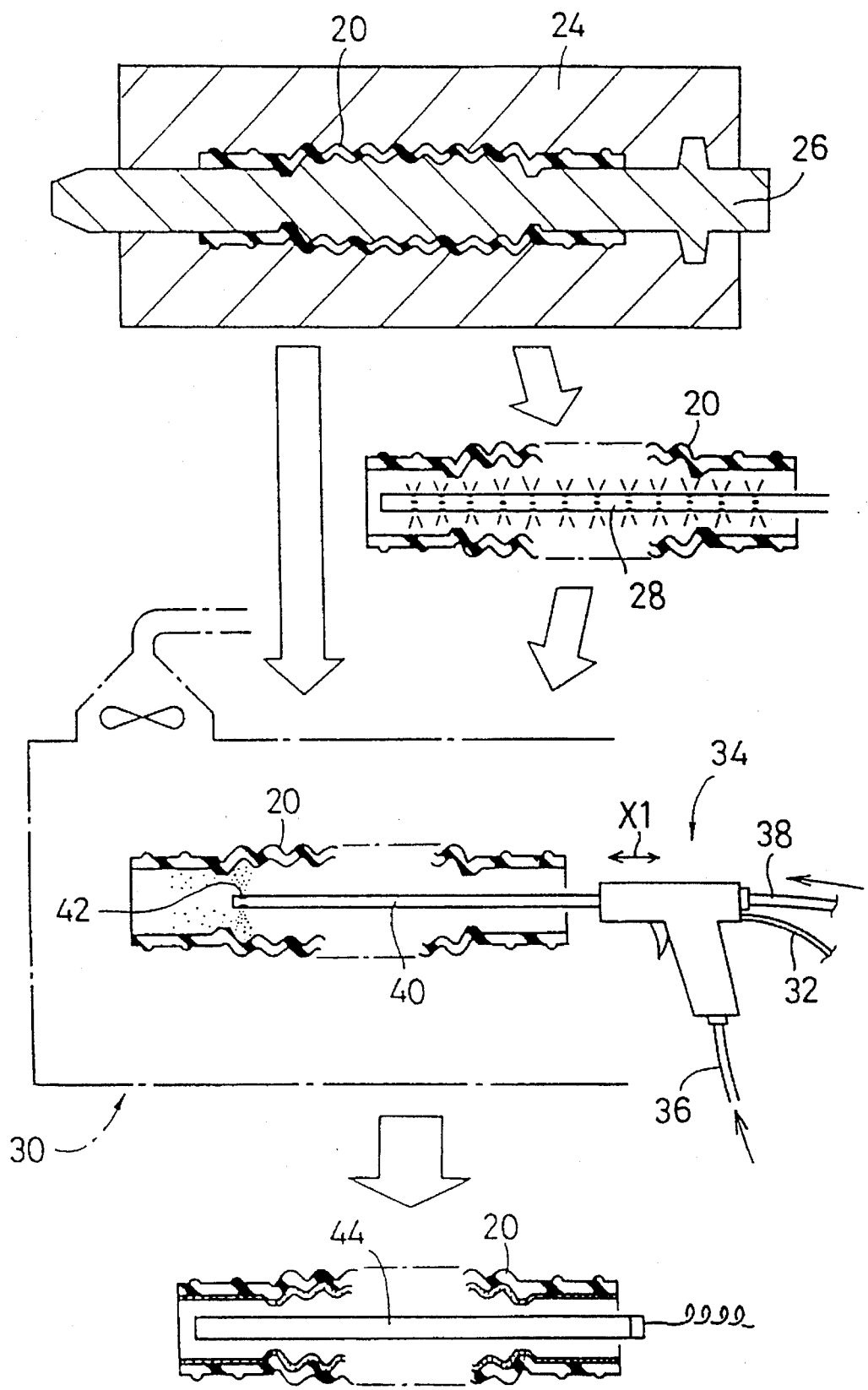
FIG. 1 are explanatory drawings for showing the steps of the method of producing a multi-layered hose according to a preferred embodiment of the present invention.

In the meanwhile, FIG. 1 shows the steps of the method of producing the hose 10. As shown in FIG. 1, in this preferred embodiment, a molding die comprising an outer die 24 and a mandrel-shaped insert die 26 is used and the rubber outer layer 20 is preformed in a vulcanized or semi-vulcanized state by die forming (for example, injection molding).

Then, the rubber outer layer 20 thus preformed is taken out of the die, and a bonding treatment is applied to the inner surface of the rubber outer layer 20. This can be conducted by the following method. First, a spray nozzle 28 is inserted into the inner space of the rubber outer layer 20 and an adhesive is spray painted from the nozzle 28, and then the rubber outer layer 20 is dried in a drying furnace or air dried.

However, the adhesive treatment is not limited to the above method. For example, an adhesive can be kneaded (mixed) in a rubber material for the rubber outer layer 20. Otherwise, an adhesive can be kneaded in a resin material for the resin inner layer 22.

After the adhesive treatment, the rubber outer layer 20 is placed in a chamber 30 shown in FIG. 1. Then, resin powder for the resin inner layer 22 is applied on the inner surface of the outer layer 20 by electrostatic painting.

To be more specific, as shown in FIG. 1, the air and resin powder are supplied through an air pipe 36 and a resin powder supply pipe 38 to a spray gun 34 which is connected to a high voltage generating apparatus through a lead wire 32. Then resin powder charged with one of negative electricity and positive electricity is spouted out from an exhaust port 42 of a long nozzle 42 fixed to the spray gun 34. In the meanwhile, the rubber outer layer 20 is held by a grounded metal plate and charged with the other of negative electricity and positive electricity. In this preferred embodiment, polyamide resin powder is charged with negative electricity, while the rubber outer layer 20 is charged with positive electricity.

The fore end of the nozzle 40 is closed and the exhaust port 42 is opened vertically, i.e., in a direction perpendicular to the axis of the nozzle 40. The resin powder which is charged with one of negative electricity and positive electricity is spouted from the nozzle 40 in a radial direction of the rubber outer layer 20, that is, in a direction perpendicular to the axis of the rubber outer layer 20, and painted to adhere to the inner surface of the rubber outer layer 20 by electrostatic attractive force. In painting, the spray gun 34 is moved in a direction of the arrow X1 shown in FIG. 1.

Figure 3A:
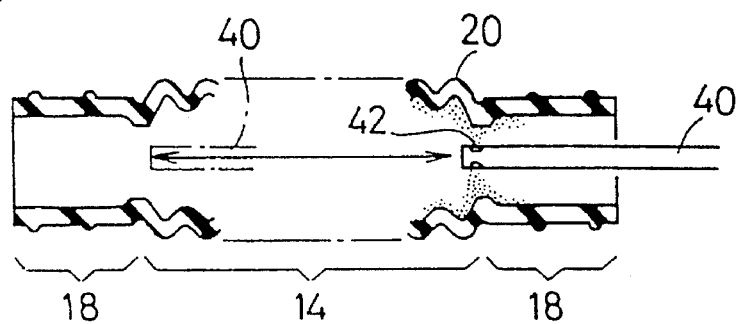
FIGS. 3(A)(a), 3(A)(b), 3(B)(a), and 3(B)(b) are explanatory drawings for showing parts of the steps of the method shown in FIG. 1 in detail.

As shown in FIG. 3(A)(a), the exhaust port 42 of the nozzle 40 is moved only in the range of the hose body portion 14. By doing so, the resin powder is painted thick at the hose body portion 14 and thin at the edge portions 18. This is because most of the resin powder spouted from the exhaust port 42 of the nozzle 40 adheres to the inner surface of the hose body portion 14 but because a small part of the resin powder also adheres to the inner surface of the edge portions 18.

After the resin powder is finished painting in the above way, the resin powder is heated and melted. An example of the heating is to place the rubber outer layer 20 painted with the resin powder in a heating oven in order to heat the whole hose 10. Another preferred example of the heating is, as shown in FIG. 1, to insert a far-infrared heater 44 into the inner space formed by the resin powder painted inner surface of the tubular rubber outer layer 20 and to heat the resin powder by the heater 44. In this ease, the resin powder coating layer can be heated by priority over the rubber outer layer 20, and the influence of heat on the rubber outer layer 20 can be avoided. For example, in the case of employing polyamide resin as the resin, the heat of 200° C. or more is required to melt the polyamide resin. However, when the rubber outer layer 20 is heated to that high temperature, the rubber will be deteriorated.

Further, high frequency induction heating or high frequency dielectric heating may be employed as a method of heating the resin powder painted on the inner surface of the rubber outer layer 20.

Of course, other heating methods can be employed to heat the resin powder coating in the method of the present invention.

When the rubber outer layer 20 is preformed in a semi-vulcanized state, vulcanization is completed in this heating step.

The resin powder coating layer is cooled after being heated and melted. Thus, the multi-layered hose 10 having the resin inner layer 22 on the inside of the rubber outer layer 20 can be produced.

Further, it is possible that in electrostatic painting, different kinds of resin is dry blended, and the mixed resin powder is applied to adhere to the inner surface of the rubber outer layer 20 and heated, thereby forming the resin inner layer 22. For example, the following method can be employed. Polyamide resin powder having a low melting point is blended with fluorine-contained resin powder having a high melting point and high alcohol penetration resistance beforehand. Then, the resin powder mixture is applied to adhere to the inner surface of the rubber outer layer 20. Then the resin coating is heated to a temperature at which only the polyamide resin melts, thereby forming the resin inner layer 22. In this case, because fluorine-contained resin particles are dispersed in the melted polyamide resin, the alcohol penetration resistance of the polyamide resin is much improved. The above description is only an example, and the resin inner layer 22 can be formed by employing other different kinds of resin powder for other purposes.

Figure 3B:
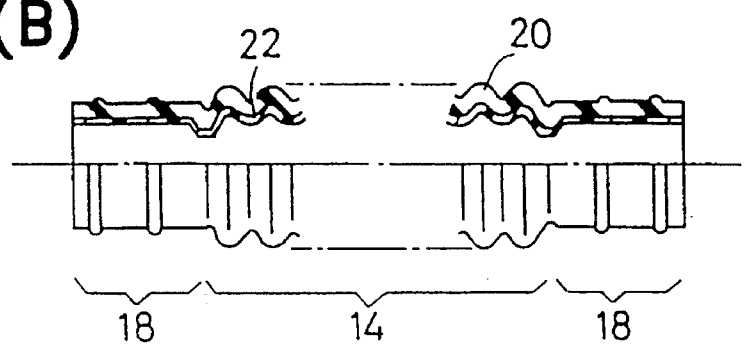
Figure 3C:
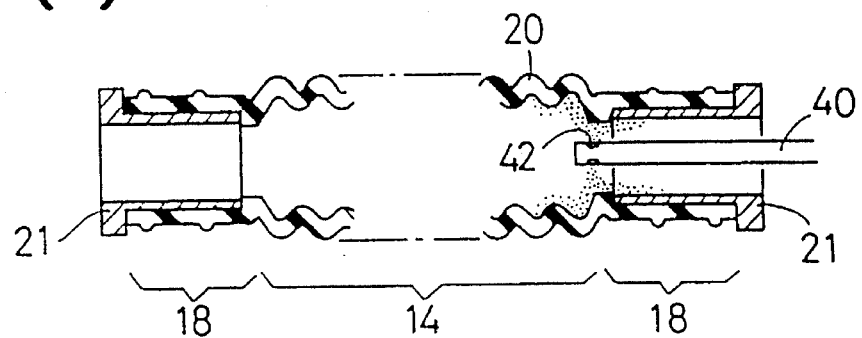
Figure 3D:
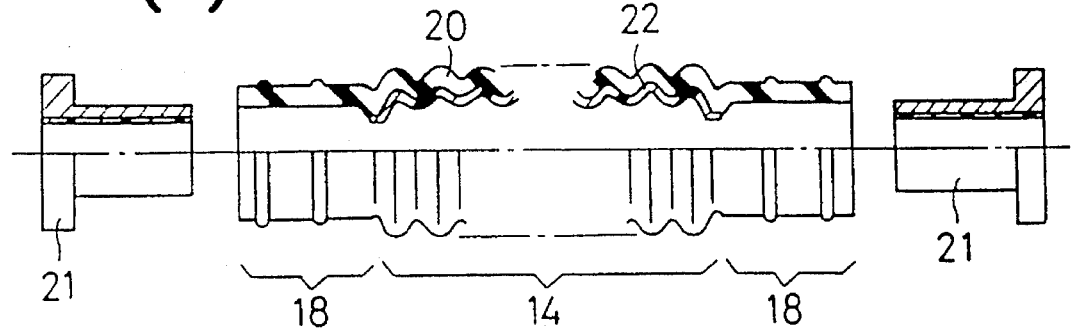

In the above preferred embodiment, the resin inner layer 22 is formed thin on the inner surface of the hose edge portions 18. However, as shown in FIGS. 3(B)(a) and 3(B)(b), the resin inner layer 22 can be formed only at the hose body portion 15 and not on the edge portions 18. This can be achieved by inserting caps 21 on the both edge portions of the rubber outer layer 20 to cover the inner surface of the edge portions 18 of the rubber outer layer 20, and painting the resin powder, and then removing the caps 21 from the edge portions 18. The caps 21 may be removed before or after heating and melting the resin powder coating. In this construction, since the rubber constituting the inner surface of the edge portions 18 directly contacts the outer circumference of the mating pipes 16, the sealing capacity between the pipe 18 and the edge portion 18 can be improved.

Figure 4:
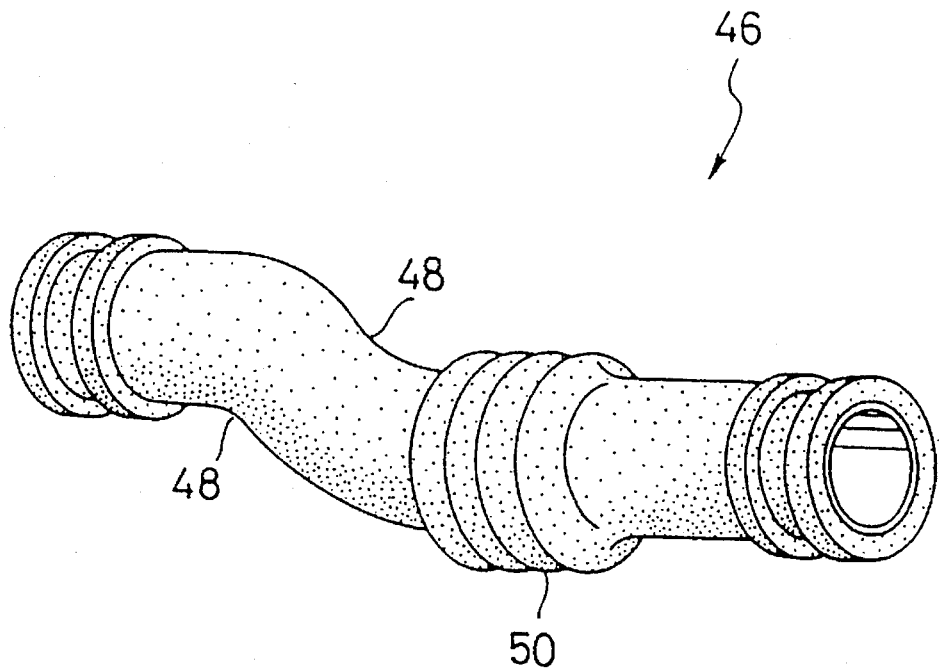
FIG. 4 is a perspective view of a hose which is different from the hose shown in FIG. 2(A) and produced by the method of another preferred embodiment of the present invention.
Figure 5A:
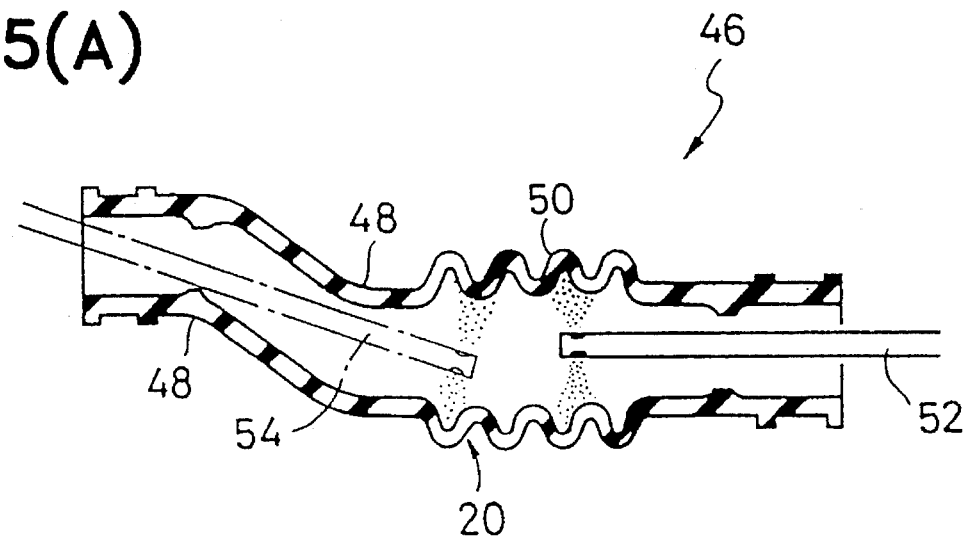
FIGS. 5(A) and 5(B) are explanatory drawings for showing parts of the steps of the method of producing the hose shown in FIG. 4 according to the present invention.
Figure 5B:
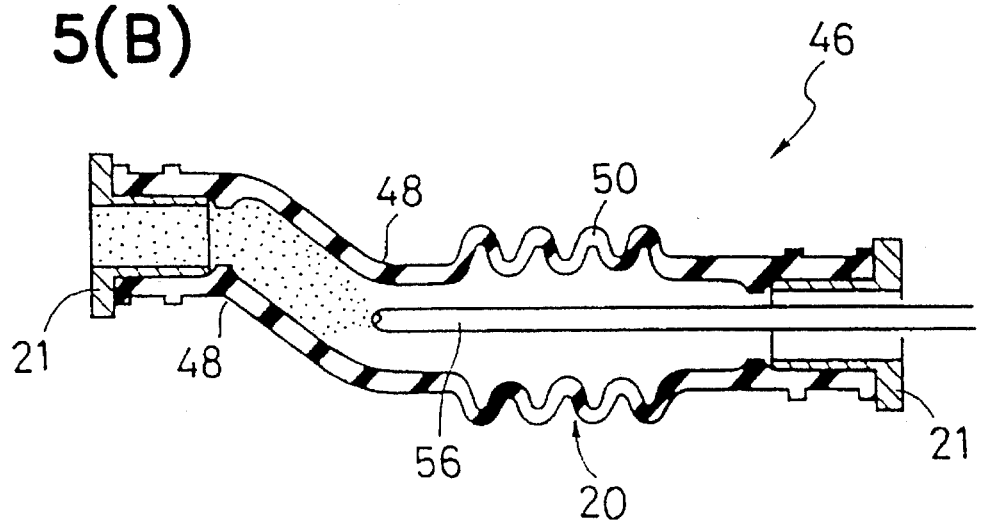
Figure 7A:
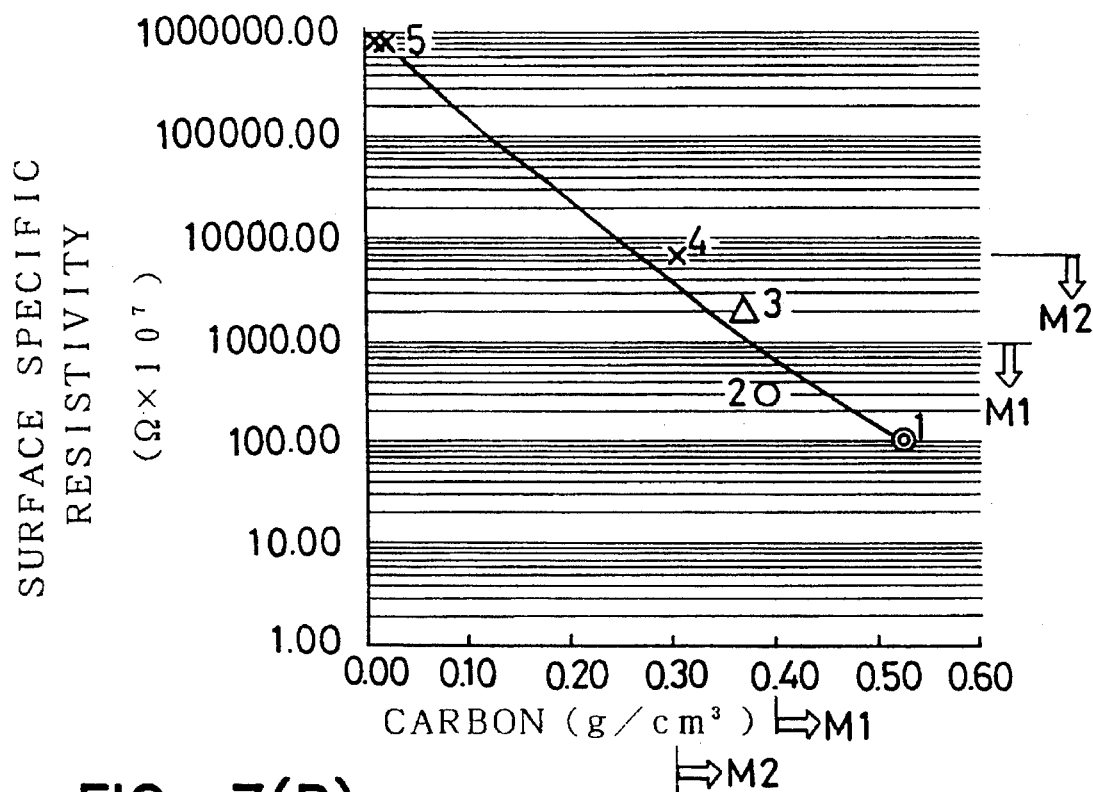
FIGS. 7(A) and 7(B) are graphs showing the relationship between the amount of carbon black and resistivity and electrostatic paintability.
Figure 7B:
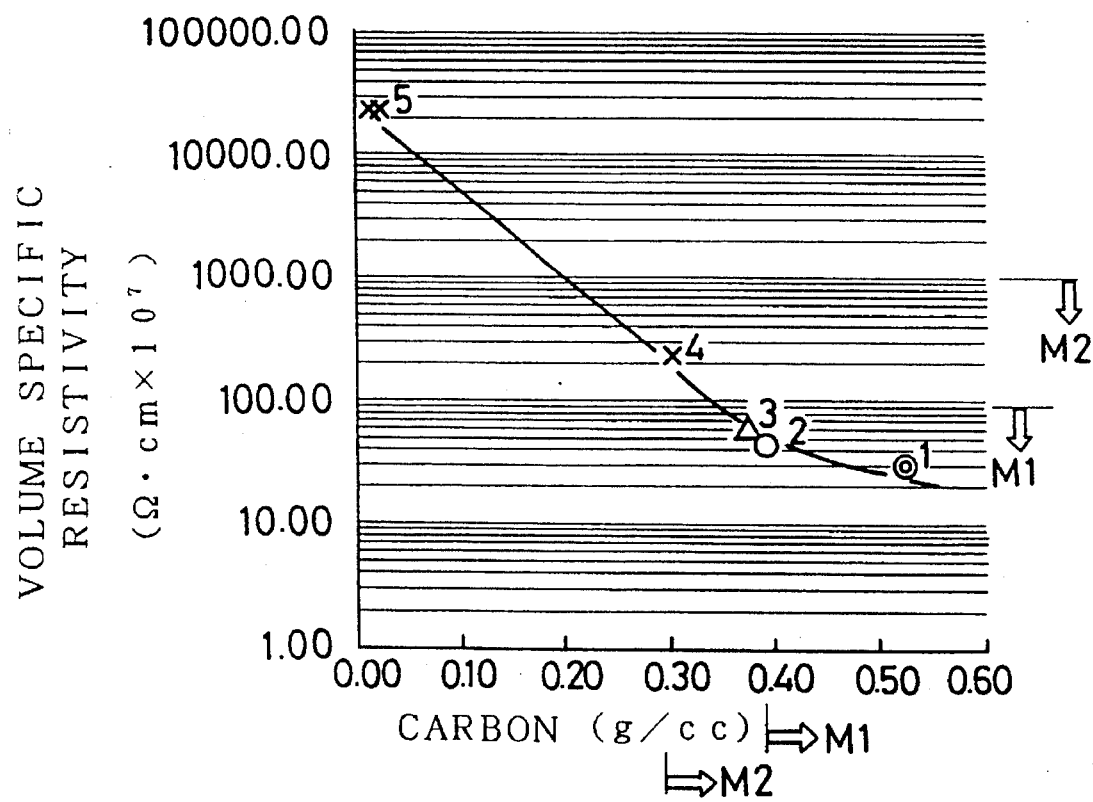
Figure 8A:
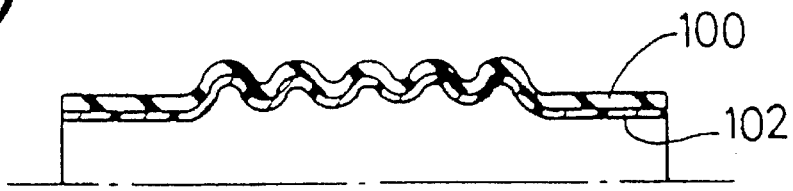
FIGS. 8(A) and 8(B)(a) are cross sectional views of conventional hoses, and FIG. 8(B)(b) is an explanatory drawing for showing the method of producing the hose shown in FIG. 8(B)(a).
Figure 8B:
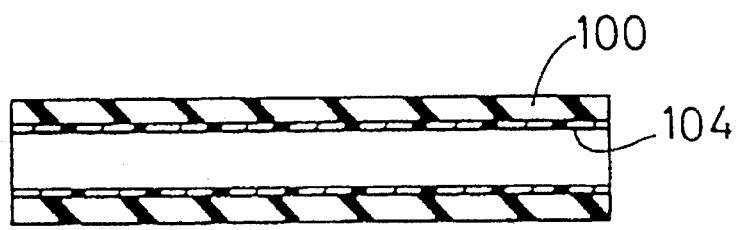
Figure 8C:
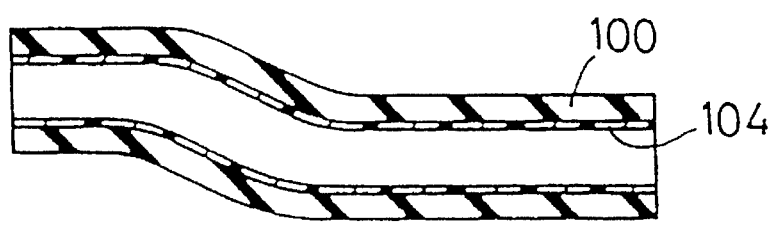
Figure 8D:
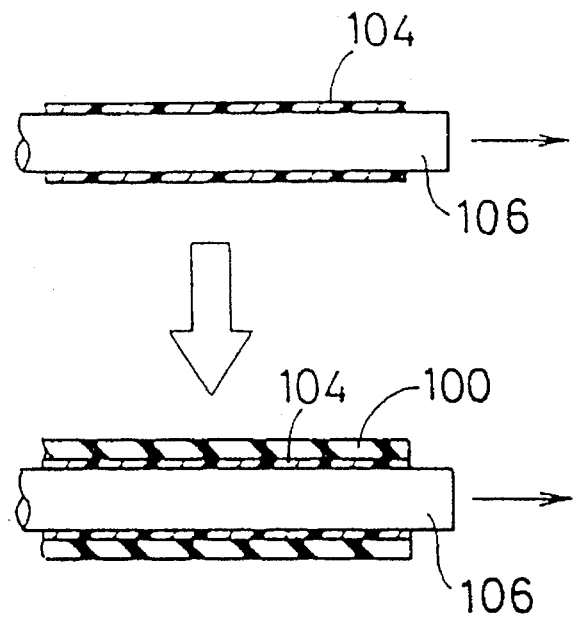

FIG. 4 shows a hose 46 having a bent portion 48 and a bellows portion 50. FIGS. 5(A) and 5(B) show examples of the methods of painting the resin powder on the inner surface of the rubber outer layer 20 in producing the hose having the shape shown in FIG. 4.

In the embodiment shown in FIG. 5(A), one nozzle 52 is inserted from one edge opening on one longitudinal end of the rubber outer layer 20 in the longitudinal direction, and from the nozzle 52 resin powder is applied on a longitudinal half of the rubber outer layer 20 by electrostatic painting. On the other hand, another nozzle 54 is inserted at an inclination from the other edge opening on the other longitudinal end of the rubber outer layer 20, and from the nozzle 54 the resin powder is applied on the other longitudinal half of the rubber outer layer 20 by electrostatic painting.

In the embodiment shown in FIG. 5(B), the shape of the fore end of the nozzle is modified to spray resin powder mainly in a forward direction so as to paint the resin powder on the inner surface of the rubber outer layer 20. In any of these embodiments, after the rubber outer layer 20 is preformed in a desired final shape beforehand, the resin powder is painted on the rubber outer layer 20 and then melted to form the resin inner layer 22. On the contrary, for example, to the case where a resin parison is inserted into the inner space of the rubber outer layer 20 and blow-molded to expand radially and adhere to the inner surface of the rubber outer layer 20 so as to form the resin inner layer 22, the thickness of the resin inner layer 22 can be prevented from varying and the resin powder coating layer which is to be the resin inner layer 22 can be formed at a desired thickness originally.

Further, although the thickness of the resin inner layer 22 is varied only between the hose body portion 14 and the edge portions 18 in the above preferred embodiments, the thickness of the resin inner layer 22 can be varied between parts of the hose body portion 14 in accordance with necessity.

The present invention may be practiced or embodied in still other ways without departing from the spirit or essential character thereof. For instance, in the method of the present invention, it is possible that a nozzle fixed to a spray gun has an opening at the fore end and that the spray of the resin powder which has been spouted in a longitudinal direction of the nozzle is deflected in a direction perpendicular to the axis of the nozzle by the function of a baffle plate. Further, electrostatic painting can be applied with appropriate modifications. Furthermore, the method of the present invention can be applied not only to the above described hoses, but also to other hoses with other shapes and other hoses for other purposes. Accordingly, it is apparent to one of the ordinary skill in the art that many changes and modifications can be made thereto without departing from the spirit or scope of the invention as set forth herein.

EXPERIMENT

A heating test using magnetic hysteresis loss was conducted by the following method.

Maghemite powder (Hc=130 (Oe), δs=80 emu/g) was added to block polymer polypropylene by 80% by weight, and the mixture was kneaded by two hot rolls at 180° C. for five minutes. The kneaded material was spreaded and hot pressed at 200° C., and then cooled for five minutes and cut into a sheet of 100×100×0.3 mm in size. Then, the sheet thus produced was sandwiched by two polypropylene sheets of 5 mm in thickness, thereby producing a test specimen.

Two E-type electromagnetic cores (E-type manganese zinc ferrite sintered bodies) were placed to face each other, and an exciting coil was wounded around one of the two cores. The pair of electromagnetic core apparatus thus formed was employed, and the test specimen was disposed between the pair of electromagnetic cores, i.e., in the magnetic path, and an alternating magnetic field was applied while pressure was applied on the test specimen in the direction of thickness. Thus, the test specimen was heated by magnetic hysteresis loss by the alternating electric filed, thereby melting and bonding to the layers together. The frequency was 95 kHz, the intensity of the alternating magnetic field was 1200 (Oe), and the time of heating was 20 seconds. As a result of the test, the layers of the test specimen were satisfactorily bonded together in twenty seconds.

What is claimed:

1. A method of producing a multi-layered hose comprising:

forming a tubular outer layer of a rubber material with a volume specific resistivity of not more than $10^{10}$ ohm cm, forming an inner layer on an inner surface of said outer layer by electrostatically painting resin on said inner surface of said outer layer, said resin having a volume specific resistivity of not more than $10^{10}$ ohm cm such that said inner layer is free of generating an electric charge when gasoline flows in contact with said inner layer, conducting said electrostatic painting by charging said resin with one of positive electricity and negative electricity and charging said outer layer with the other of positive electricity and negative electricity, heating said electrostatically painted resin on said inner surface of said outer layer, said heating being conducted by a heating source placed in the inside of the electrostatically painted resin, and cooling said electrostatically painted resin.

2. A method of producing a multi-layered hose according to claim 1, wherein said inner surface of said outer layer is roughened before said electrostatic painting.

3. A method of producing a multi-layered hose according to claim 1, wherein said outer layer has edge openings on both longitudinal ends thereof and said method comprises the steps of:

inserting a tubular cap into at least one edge opening of at least one longitudinal end of said outer layer, conducting said electrostatic painting of said resin on the inner surface of said outer layer with said cap on, and removing said cap from said edge opening after said electrostatic painting.

4. A method of producing a multi-layered hose according to claim 1, wherein said outer layer has edge openings on both longitudinal ends thereof, a bar nozzle is inserted into at least one of said edge openings, and said resin is painted by spouting said resin from said bar nozzle in at least one of a radial direction and an axial direction of said bar nozzle.

5. A method of producing a multi-layered hose according to claim 1, wherein said resin constituting said resin inner layer is at least one of polyamide resin, fluorine-contained resin, polyester resin, polyvinyl chloride resin, polyacetal resin and polyphenylene sulfide resin.

6. A method of producing a multi-layered hose according to claim 1, wherein said heating source is placed adjacent to the inner surface of said electrostatically painted resin.

7. A method of producing a multi-layered hose according to claim 1, wherein in said heating step, said resin inner layer is heated by an alternating magnetic field or an alternating electric field.

8. A method of producing a multi-layered hose according to claim 7, wherein said resin constituting said resin inner layer contains at least one of metal powder, electric conductors, and magnetic substance powder, and said heating is conducted by induction heating.

9. A method of producing a multi-layered hose according to claim 7, wherein said resin constituting said resin inner layer contains dielectric substance, and said heating is conducted by dielectric heating.

10. A method of producing a multi-layered hose according to claim 1, wherein said outer layer comprises a body portion and edge portions which are respectively connected to both ends of said body portion and are to be connected to mating pipes.

11. A method of producing a multi-layered hose according to claim 10, wherein the thickness of said resin inner layer at said edge portions is smaller than the thickness of said resin inner layer at said body portion of said outer layer.

12. A method of producing a multi-layered hose according to claim 10, wherein said resin inner layer is electrostatically painted only on the inner surface of said body portion of said outer layer, and not on the inner surface of said edge portions of said outer layer.

13. A method of producing a multi-layered hose according to claim 10, wherein said body portion of said outer layer has at least one of a bellows portion and a bent portion, and said resin inner layer has at least one of a bellows portion and a bent portion which faces to said one of a bellows portion and a bent portion of said outer layer.

14. A method of producing a multi-layered hose according to claim 8, wherein said electric conductors are powder, and said metal powder, said electric conductors and said magnetic substance powder have a particle size of 1 to 500 microns.

15. A method of producing a multi-layered hose according to claim 9, wherein said dielectric substance is powder and has a particle size of 1 to 500 microns.

16. A method of producing a multi-layered hose comprising:

forming a tubular outer layer having at least one edge opening, inserting a tubular cap into said at least one edge opening of said outer layer, painting a resin inner layer on an inner surface of said outer layer while said tubular cap is in place, and removing said cap from said at least one edge opening after said painting.

17. A method of producing a multi-layered hose comprising:

forming a tubular outer layer, forming at least one intermediate layer on an inner surface of said outer layer, said at least one intermediate layer containing at least one of metal powder, electric conductors and magnetic substance powder, painting a resin inner layer on said at least one intermediate layer, said resin inner layer containing none of metal powder, electric conductors, and magnetic substance powder, and heating said resin inner layer by dielectric heating.

18. A method of producing a multi-layered hose comprising:

forming a tubular outer layer, forming at least one intermediate layer on an inner surface of said outer layer, said at least one intermediate layer containing a dielectric substance, painting a resin inner layer on said at least one intermediate layer, said resin inner layer containing no dielectric substance, and heating said resin inner layer by dielectric heating.

19. A method of producing a multi-layered hose comprising:

forming a tubular outer layer, said outer layer including a body portion and edge portions which are respectively connected to both ends of said body portion and are to be connected to mating pipes, said body portion having a bellows portion, and painting a resin inner layer on an inner surface of said outer layer having said bellows portion by electrostatically painting resin, wherein said resin is charged with one of positive electricity and negative electricity and said outer layer is charged with the other of positive electricity and negative electricity, and a bar nozzle is inserted into an opening of at least one of said edge portions, and said resin is painted by spouting said resin from said bar nozzle in at least one of a radial direction and an axial direction of said bar nozzle, and heating said electrostatically painted resin by a heating source placed in the inside of the electrostatically painted resin.

20. A method of producing a multi-layered hose according to claim 19, wherein a thickness of said resin inner layer at said edge portions is smaller than a thickness of said resin inner layer at said body portion of said outer layer.

21. A method of producing a multi-layered hose according to claim 19, wherein said resin inner layer is painted only on the inner surface of said body portion of said outer layer, and not on the inner surface of said edge portions of said outer layer.

22. A method of producing a multi-layered hose comprising:

forming a tubular outer layer, said outer layer including a body portion and edge portions which are respectively connected to both ends of said body portion and are to be connected to mating pipes, said body portion having a bent portion, and painting a resin inner layer on an inner surface of said outer layer having said bent portion by electrostatically painting resin, wherein said resin is charged with one of positive electricity and negative electricity and said outer layer is charged with the other of positive electricity and negative electricity, and a bar nozzle is inserted into an opening of at least one of said edge portions, and said resin is painted by spouting said resin from said bar nozzle in at least one of a radial direction and an axial direction of said bar nozzle, and heating said electrostatically painted resin by a heating source placed in the inside of the electrostatically painted resin.

23. A method of producing a multi-layered hose comprising:

forming a tubular outer layer of a rubber material having edge openings on both longitudinal ends thereof, inserting a tubular cap into at least one edge opening of at least one longitudinal end of said outer layer, forming an inner layer on an inner surface of said outer layer by electrostatically painting resin on said inner surface of said outer layer with said cap on, conducting said electrostatic painting by charging said resin with one of positive electricity and negative electricity and charging said outer layer with the other of positive electricity and negative electricity, heating said electrostatically painted resin on said inner surface of said outer layer, cooling said electrostatically painted resin, and removing said cap from said edge opening after said electrostatic painting.

24. A method of producing a multi-layered hose comprising:

forming a tubular outer layer of a rubber material, forming at least one intermediate layer on an interior surface of said outer layer, forming an inner layer adjacent to said at least one intermediate layer by electrostatically painting resin on said at least one intermediate layer, said at least one intermediate layer containing at least one of metal powder, electric conductors, and magnetic substance powder, and said resin inner layer adjacent to said at least one intermediate layer containing none of metal powder, electric conductors, and magnetic substance powder, conducting said electrostatic painting by charging said resin with one of positive electricity and negative electricity and charging said outer layer with the other of positive electricity and negative electricity, heating said electrostatically painted resin adjacent to said at least one intermediate layer by dielectric heating, and cooling said electrostatically painted resin.

25. A method of producing a multi-layered hose comprising:

forming a tubular outer layer of a rubber material, forming at least one intermediate layer on an interior surface of said outer layer, forming an inner layer adjacent to said at least one intermediate layer by electrostatically painting resin on said at least one intermediate layer, said at least one intermediate layer containing dielectric substance, and said resin inner layer adjacent to said at least one intermediate layer containing no dielectric substance, conducting said electrostatic painting by charging said resin with one of positive electricity and negative electricity and charging said outer layer with the other of positive electricity and negative electricity, heating said electrostatically painted resin adjacent to said at least one intermediate layer by dielectric heating, and cooling said electrostatically painted resin.

26. A method of producing a multi-layered hose comprising:

forming a tubular outer layer of rubber material including a body portion and edge portions which are respectively connected to both ends of said body portion and are to be connected to mating pipes, forming an inner layer on an inner surface of said outer layer by electrostatically painting resin on said inner surface of said outer layer, a thickness of said resin inner layer at said edge portions being smaller than the thickness of said resin inner layer at said body portion of said outer layer, conducting said electrostatic painting by charging said resin with one of positive electricity and negative electricity and charging said outer layer with the other of positive electricity and negative electricity, heating said electrostatically painted resin on said inner surface of said outer layer, and cooling said electrostatically painted resin.

27. A method of producing a multi-layered hose comprising:

forming a tubular outer layer of rubber material including a body portion and edge portions which are respectively connected to both ends of said body portion and are to be connected to mating pipes, forming an inner layer on an inner surface of said outer layer by electrostatically painting resin on said inner surface of said outer layer, said resin inner layer being electrostatically painted only on the inner surface of said body portion of said outer layer, and not on the inner surface of said edge portions of said outer layer, conducting said electrostatic painting by charging said resin with one of positive electricity and negative electricity and charging said outer layer with the other of positive electricity and negative electricity, heating said electrostatically painted resin on said inner surface of said outer layer, and cooling said electrostatically painted resin.

28. A method of producing a multi-layered hose comprising:

forming a tubular outer layer, said outer layer including a body portion and edge portions which are respectively connected to both ends of said body portion and are to be connected to mating pipes, and painting a resin inner layer on an inner surface of said outer layer such that a thickness of said resin inner layer at said edge portions is smaller than a thickness of said resin inner layer at said body portion of said outer layer.

29. A method of producing a multi-layered hose comprising:

forming a tubular outer layer, said outer layer including a body portion and edge portions which are respectively connected to both ends of said body portion and are to be connected to mating pipes, and painting a resin inner layer on an inner surface of said outer layer, said resin inner layer being painted only on the inner surface of said body portion of said outer layer, and not on the inner surface of said edge portions of said outer layer.

* * * * *